United States Patent [19]
Mori

[11] Patent Number: 5,177,703
[45] Date of Patent: Jan. 5, 1993

[54] DIVISION CIRCUIT USING HIGHER RADICES

[75] Inventor: Junji Mori, Yokohama, Japan

[73] Assignee: Kabushiki Kaisha Toshiba, Kanagawa, Japan

[21] Appl. No.: 796,426

[22] Filed: Nov. 22, 1991

[30] Foreign Application Priority Data

Nov. 29, 1990 [JP] Japan ................................ 2-325741

[51] Int. Cl.$^5$ .............................................. G06F 7/52
[52] U.S. Cl. ................................................. 364/767
[58] Field of Search ............... 364/767, 765, 766, 764, 364/761

[56] References Cited

U.S. PATENT DOCUMENTS

| | | | |
|---|---|---|---|
| 4,546,447 | 10/1985 | Sawada | 364/767 |
| 4,722,069 | 1/1988 | Ikeda | 364/767 |
| 4,754,422 | 6/1988 | Sakai et al. | 364/761 |
| 4,797,849 | 1/1989 | Nakano | 364/765 |
| 5,105,378 | 4/1992 | Mori | 364/761 |

OTHER PUBLICATIONS

Computer No Kousokuenzanhoushiki, by Wang, for Computer Arithmetic Chapter 7, Sec 9, pp. 236–240, 1980.

Primary Examiner—Tan V. Mai
Attorney, Agent, or Firm—Finnegan, Henderson, Farabow, Garrett and Dunner

[57] ABSTRACT

A division circuit having a plurality of stages based on a repeat arithmetic operation method, with each stage having: a constant multiplier for multiplying a divisor by a predetermined constant multiple; a carry save type adder (CSA) for performing an addition operation between a dividend and the constant multiple value of the divisor provided from the constant multiplier, then for outputting a sum component and a carry component as a result of the addition operation; shifters for shifting the sum component and the carry component by a shift amount in accordance with a radix, respectively; a carry propagation adder (CPA) for performing an addition operation between the upper bits of the shifted sum component and the shifted carry component obtained by the shifter by predetermined bits; and comparators for outputting a part of a quotient having a plurality of bits by comparing the result obtained by the CPA and the constant multiple value of the divisor, then for determining the value of the constant multiple of the constant multiplier based on the comparison result. In the division circuit, the value of the constant multiple at the following constant multiplier is determined by the output of the comparator and the output of the CPA, the sum component and the carry component obtained by the CSA are provided to a CSA in the following stage, and the dividend and zero in place of the sum component and the carry component are input to the CSA in the first stage.

4 Claims, 4 Drawing Sheets

DIVISION CIRCUIT USING HIGHER RADICES

BACKGROUND OF THE INVENTION

1. Field of the Invention

This invention relates to a division circuit which is capable of performing faster division operation based on a repeat arithmetic operation method using higher radices.

2. Description of the Prior Art

In general, various division methods are well known. One of these division methods is a repeat arithmetic operation method. The repeat arithmetic operation method is explained as follows:

First, a dividend is subtracted from a divisor, then the partial remainder as the result of the subtraction is compared with the divisor in a first stage. In the next stage, an arithmetic operation is determined by the result of the comparison operation. These operations are performed repeatedly at every stage.

FIG. 1 is a schematic diagram of the conventional division circuit based on the repeat arithmetic operation method showing three stage arithmetic operations. In the first stage of the division circuit shown in FIG. 1, a divisor is provided to a complement circuit 1 to obtain a 1's complement of the divisor. A dividend and the 1's complement are input to an adder 2. The output of the adder 2 is provided to a shifter 3. Then, the output of the shifter 3 is input to an adder 12 and a complement circuit 11 in the second stage. These data streams are repeated at every stage.

Thus, the division circuit comprises many arithmetic stages, each arithmetic stage comprising the complement circuit generating the 1's-complement of the divisor, the carry propagation adder (CPA), and the shifter.

In the division circuit having the above configuration, the 1's-complement of the divisor is calculated by the complement circuit 1 in accordance with the value of a sign bit in a shift output of a shifter (not shown) in the preceding stage. Then, the divisor or the 1's complement of the divisor is added to the value of the shifter 3 to get a partial remainder at the CPA 2. Next, the calculated partial remainder is shifted by the shifter 3, then is output to one of the inputs of the following stage. At this time, a sign bit of the partial remainder obtained in this stage is given to one of the inputs of the first stage CPA 2. A dividend is provided to one input terminal of the first stage CPA 2.

As described above, the arithmetic process is performed repeatedly in the sequential stages by receiving the arithmetic result obtained at the preceding stage until a satisfactory quotient is obtained.

A division circuit which is capable of speeding up division by using higher radices is also available.

FIG. 2 is a schematic diagram of the conventional division circuit based on the higher radix division technique, which shows three stage arithmetic operations.

In the division circuit shown in FIG. 2, a value obtained by multiplying a divisor by a constant value at a constant multiplier 41 is provided to one of the input terminals of a CPA 42. A shift output shifted by (Log2 (radix)) is provided to the other input terminal of the CPA 42.

In addition, in the division circuit which uses higher radices (4, 8, 16, . . . ) shown in FIG. 2, a multiple value in each constant multiplier (41, 51, 61, . . . ) is determined based on the result obtained by a comparison operation between a partial remainder as a result of each CPA (42, 52, 62, . . . ) operation and each constant multiple of a divisor. A plurality of the constant multiple values is provided to each stage, (as shown in FIG. 2, the divisor x Ca, the divisor x Cb, . . . ).

Accordingly, in the division circuit shown in FIG. 2 the determining operation described above is operated by a plurality of comparators 44, 45, . . . , and 54, 55, . . . in the first and the second stages. The result of each comparison operation in each stage is provided as a quotient to a quotient register (not shown) and the constant multiplier in the following stage. Thereby, at each constant multiplier (41, 51, 61, . . . ) the divisor is multiplied by a specified multiple value.

Moreover, in the division circuit using the higher radices, not all bits of the divisor and all bits of the dividend are required for the comparison operation between the partial remainder and the constant multiple value of the divisor. The number of bits of the divisor and the dividend required for the comparison operation is less than the total number of bits of the divisor and the dividend. A satisfactory number of bits for the divisor and the dividend is the number of bits by which the arithmetic operation converges in the following stage. Thus, the increasing of the comparator configuration can be stopped even if the number of the bits of the divisor or the dividend increases.

Therefore a quotient having a plurality of bits is obtained at each stage in a division circuit using higher radices and the number of stages can be reduced so that a higher speed division calculation can be achieved in a smaller size division circuit.

In the conventional division circuit, as described above in detail, an addition operation is a main arithmetic operation in each stage. The addition operation is carried out by a carry propagation adder (CPA) 2 in which a carry is propagated to the upper side. Accordingly, much time is required for the carry propagation in each stage when the data length of a divisor and a dividend become long. This causes a reduced addition operation in each stage of the division circuit.

Therefore the total speed of the division circuit is further increased. This is a problem.

SUMMARY OF THE INVENTION

An object of the invention is to provide a division circuit which is capable of providing a faster division operation not dependent on the data length of a divisor and a dividend.

According to a preferred embodiment of the present invention, in a division circuit with a plurality of stages based on a repeat arithmetic operation method, each stage comprises:

constant multiple means for multiplying a divisor by a predetermined constant multiple;

first addition means for performing an addition operation between a dividend and the constant multiple value of the divisor provided from the constant multiple means, then for outputting a sum component and a carry component as a result of the addition operation;

shift means for shifting the sum component and the carry component by a shift amount in accordance with a radix, respectively;

second addition means for performing an addition operation between the upper bits of the shifted sum component and the shifted carry component obtained by the shift means by predetermined bits; and comparison means for outputting a part of a quotient comprising a plurality of bits by comparing the result obtained by the second addition means and the constant multiple value of the divisor, then for determining the value of the constant multiple of the constant multiple means based on the comparison result. In the division circuit, the value of the constant multiple at the following constant multiple means is determined by the output of the comparison means and the output of the second addition means, the sum component and the carry component obtained by the first addition means are provided to a first addition means in the following stage, and the dividend and zero in place of the sum component and the carry component are input to the first addition means in the first stage.

More particularly, the first addition means comprises a carry save type adder based on a carry save method in which a sum component and a carry component are output and a carry isn't propagated, and the second addition means comprises a carry propagation type adder.

In another preferred embodiment according to the present invention, a division circuit having a plurality of stages based on a repeat arithmetic operation method, each stage comprising:

constant multiple means for multiplying a divisor by a predetermined constant multiple;

first addition means for performing an addition operation between a dividend and the constant multiple value of the divisor provided from the constant multiple means, then for outputting a sum component and a carry component as a result of the addition operation;

shift means for shifting the sum component and the carry component by a shift amount in accordance with a radix, respectively;

second addition means for performing an addition operation between the upper bits of the shifted sum component and the shifted carry component obtained by the shift means by predetermined bits; and third addition means for performing an addition operation between the upper bits of the result of the addition operation obtained by the second addition means in the preceding stage and the constant multiple value of the divisor obtained by the constant multiple means in the preceding stage;

comparison means for outputting a part of a quotient comprising a plurality of bits by comparing the result obtained by the third addition means and the constant multiple value of the divisor, then for determining the value of the constant multiple of the constant multiple means based on the comparison result. In the division circuit, the value of the constant multiple at the following constant multiple means is determined by the output of the comparison means and the output of the second addition means, the sum component and the carry component obtained by the first addition means are provided to a first addition means in the following stage, and in their place the dividend and zero of the sum component and the carry component are input to the first addition means in the first stage.

More particularly, the first addition means comprises a carry save type adder based on a carry save method in which a sum component and a carry component are output and a carry isn't propagated, and the second addition means and the third addition means each comprise a carry propagation type adder.

These and other objects, feature and advantages of the present invention will be more apparent from the following description of a preferred embodiments, taken in conjunction with the accompanying drawings.

DETAILED DESCRIPTION OF THE EMBODIMENTS

Figure 1:
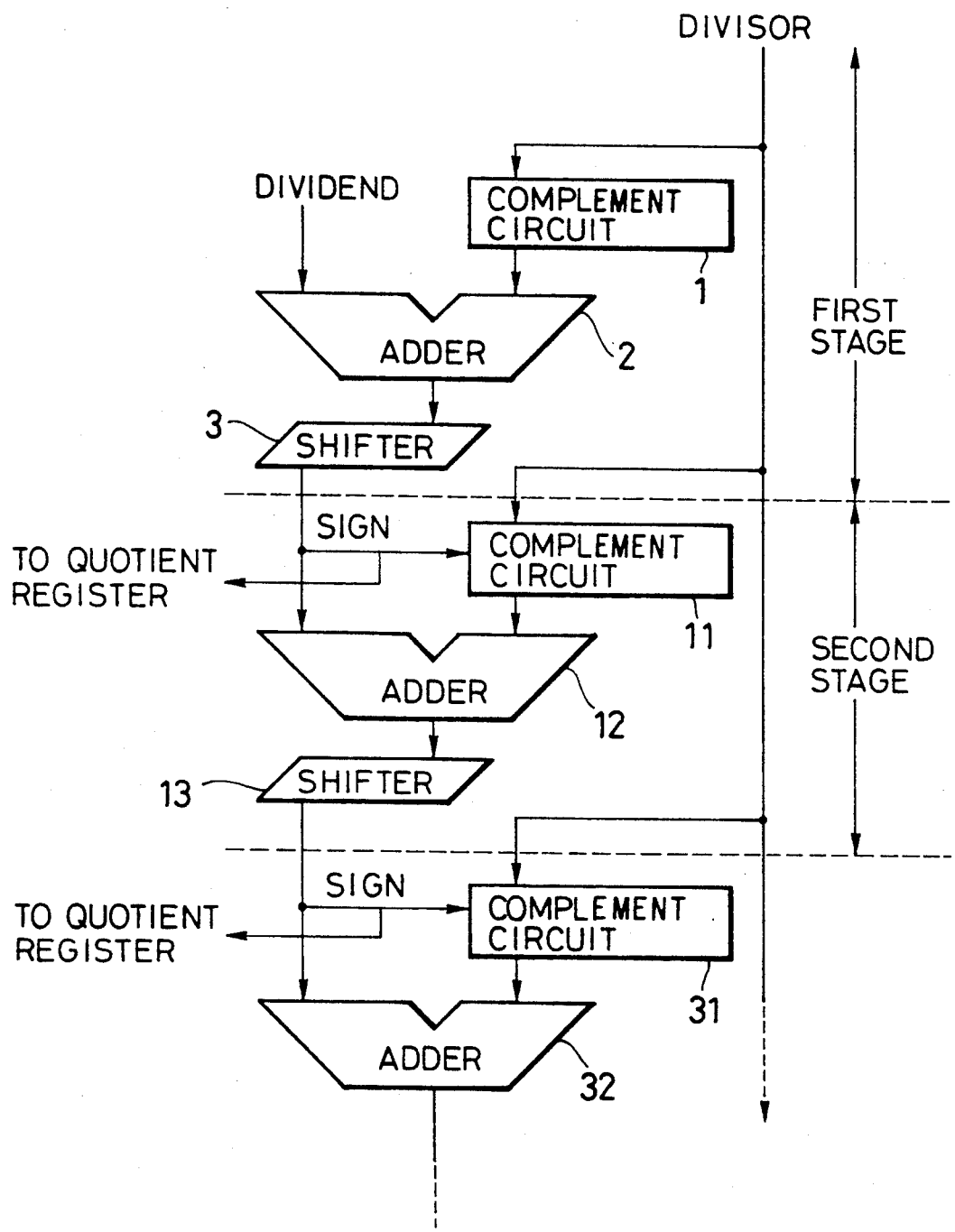
FIG. 1 is a schematic diagram of a configuration of a conventional division circuit.
Figure 2:
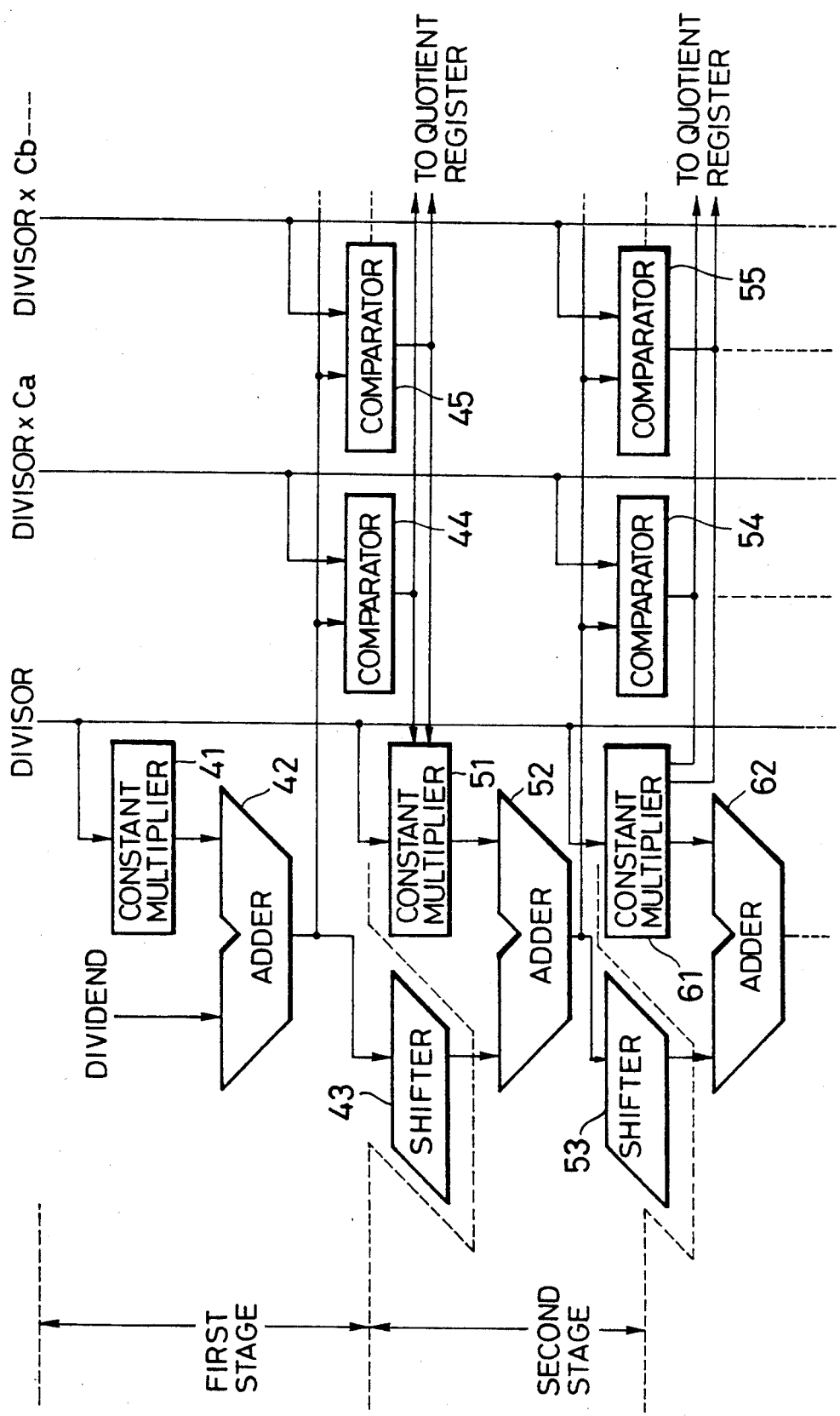
FIG. 2 is a schematic diagram of a configuration of a conventional division circuit using higher radices.

A preferred embodiment according to the present invention will be now explained referring to the drawings.

Figure 3:
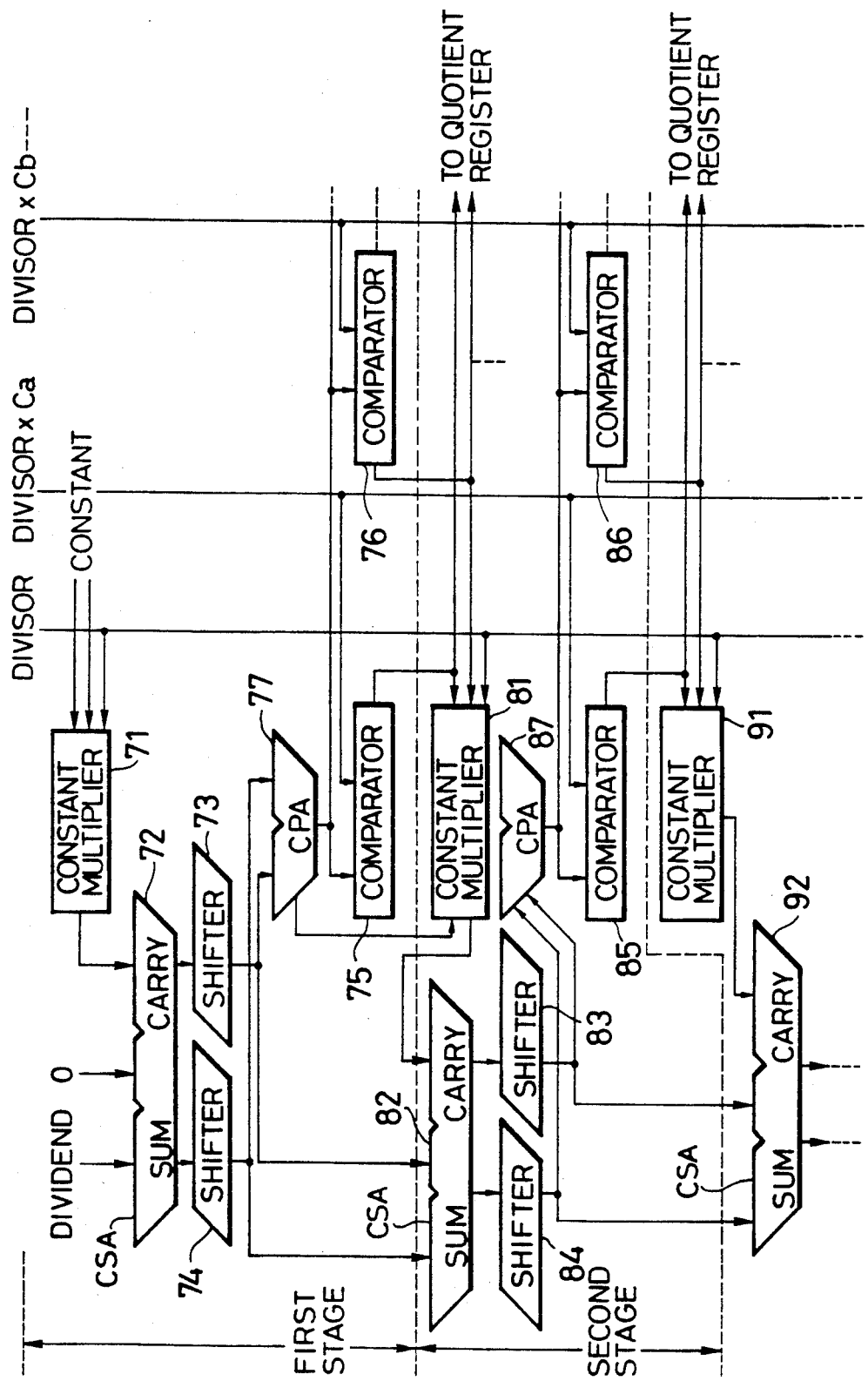
FIG. 3 is the schematic diagram of a configuration of a division circuit of a first embodiment according to the present invention.

FIG. 3 is the schematic diagram of a configuration of a division circuit of a first embodiment according to the present invention. In FIG. 3, the division circuit comprises a plurality of stages. The stages are interconnected in series and each has the same configuration. The first stage comprises a constant multiplier 71, a carry save type adder (CSA) 72, a carry propagation adder (CPA) 77, shifters 73 and 74, and comparators 75 and 76. A divisor is input to the constant multiplier 71. The output of the constant multiplier 71 is provided to one of the terminals of the CSA 72. Zero ("0") and a dividend are input to the other terminals of the CSA 72. A sum component and a carry component output from the CSA 72 are shifted by the shifters 73 and 74, respectively. The outputs of the shifters 73 and 74 are input to the CPA 77 in the first stage and the input terminals of the CSA 82 in the following stage. The output of the CPA 77 is provided to each comparator 75, 76, . . . .

The constant multiplier 71 provides a value obtained by multiplying the divisor by a constant multiple to one of the input terminals of the CSA 72. The constant multiple is obtained by multiplying the divisor by a plus constant multiple or a minus constant multiple indicated by a comparator in a preceding stage. The constant multiplier 71 outputs a 1's complement of the value obtained by multiplying the divisor by a multiple when the minus constant multiple is selected.

The CSA 72 inputs a sum component and a carry component obtained by an addition operation in the preceding stage and the value obtained by multiplying the divisor by the constant multiple provided from the constant multiplier 71 to obtain the result of an addition operation which comprises a sum component and a carry component based on the carry keeping method.

At the first stage the dividend is input as a dividend component and zero ("0") is input as a carry component to the CSA 72. Next, a sum and a carry component as a result of an addition operation in the CSA 72 are input to the shifters 73 and 74.

The sum and the carry component output from the CSA 72 is shifted to the upper side by (Log2 (radix)) at the shifters 73 and 74. The output of the shifters 73 and 74 are provided to one of the terminals of the CSA 82 in the following stage. In addition, several upper bits in the format of the output provided from each of the shifters 73 and 74 are provided to the CPA 77 in the same stage. These upper bits as the output of each of the shifters 73 and 74 are transferred to the constant multiplier 81 in the second stage through the CPA 77. These upper bits are used only for determining a multiple value for the constant multiplier 81. Therefore not all bits from the shifter output are necessary. The number of bits provided to the constant multiplier is determined from the result of an arithmetic calculation in the following stage.

The number of bits is determined by not only the length of a divisor or a dividend but also by a set radix. For example, the number of bits is approximately the upper 6 bits of the shifter output when the radix is 4.

The shifter output of a predetermined bit length provided from each of the shifters 73 and 74 in the first stage is added by the CPA 77 to obtain the sum component and the carry component. The result of the addition calculation at the CPA 77 is provided to the comparators 75, 76, . . . .

The number of comparators 75, 76, . . . is determined by the number of multiples, for example Ca, Cb, . . . by which the divisor is multiplied in the first stage. Each comparator compares the result of the addition operation in the CPA 13 and the constant multiple value. The result of the comparison operation at the comparator is provided to the quotient register.

As described above in detail, in the division circuit according to a preferred embodiment of the present invention, the partial remainder is divided into the sum component and the carry component by the carry save adder (CSA) as a carry save type adder. Then the sum component and the carry component as a result of the addition operation at the CSA are provided to a CSA in the following stage.

In the division circuit of the embodiment, it is not necessary to carry out the carry propagation operation from the lower side to the upper side at the CSA in each stage when the partial remainder is calculated. Therefore the higher operation speed of the division circuit can be achieved independent of the length of each of the divisor and the dividend. In addition, the delay time at each stage in the division circuit of this embodiment can be smaller than that of the conventional division circuit.

The CPA as a carry propagation type adder is required in each stage of the division circuit of this embodiment for obtaining the actual partial remainder in which the sum component and the carry component of the partial remainder are calculated completely and not divided. However, the carry propagation operation in the CPA is performed for only the several upper bits of the partial remainder even if the radix is a larger number having a large bit length. Therefore the carry propagation operation at the CPA does not require much time.

Accordingly, by using the division circuit of the embodiment, the higher division operation can be achieved independing of the bit length of the divisor and the dividend.

Figure 4:
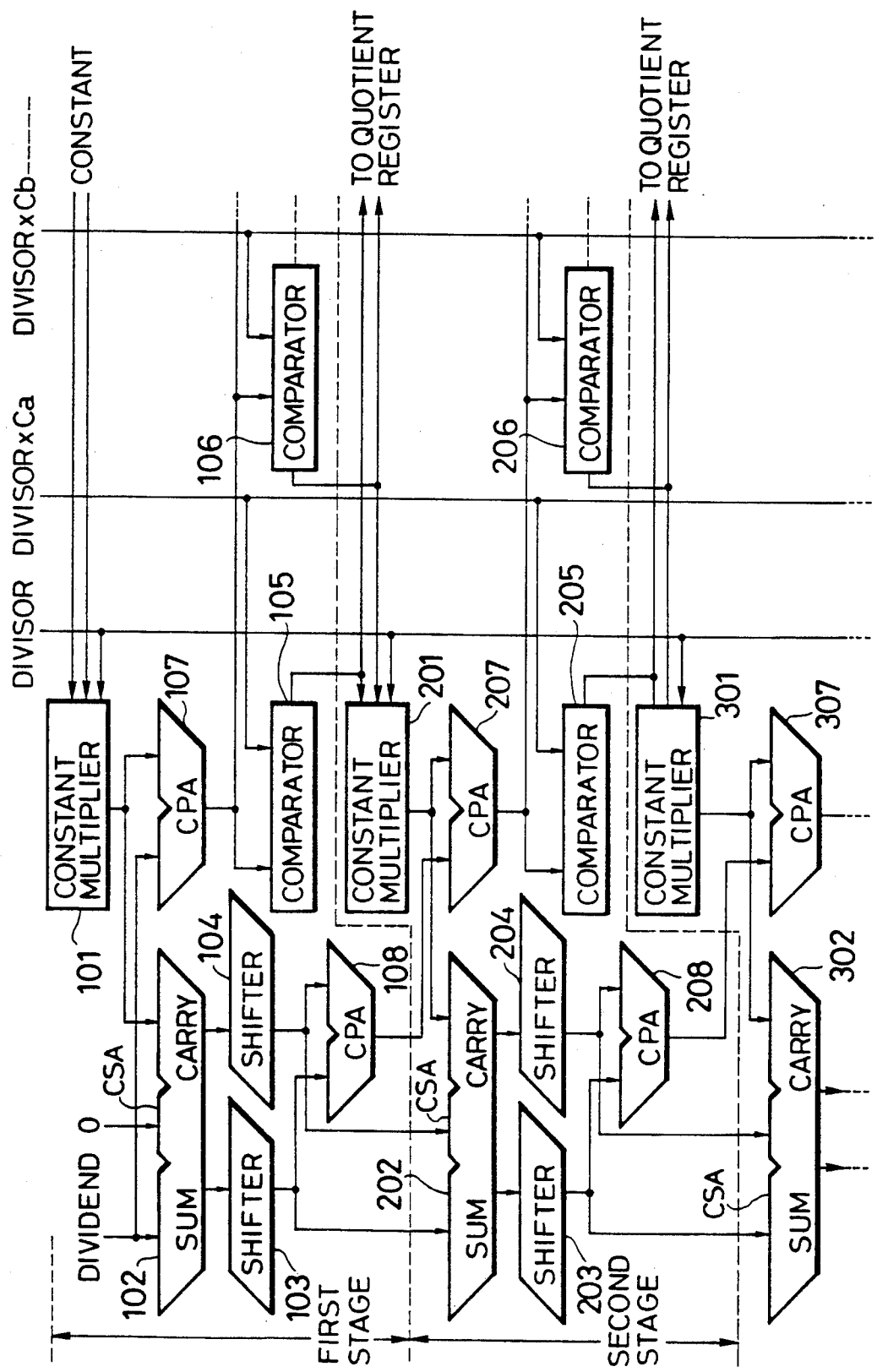
FIG. 4 is the schematic diagram of a configuration of a division circuit of a second embodiment according to the present invention.

FIG. 4 is a schematic diagram of the configuration of a division circuit of a second embodiment according to the present invention. In the FIG. 4, the division circuit comprises a plurality of stages. The stages are connected in series and each has the same configuration. The first stage comprises a constant multiplier 101, a carry save type adder (CSA) 102, carry propagation adders (CPAs) 107 and 108, shifters 103 and 104, and comparators 105 and 106. The feature of the division circuit according to the second embodiment is that it contains two CPAs. The output of the CPA is input to one of the input terminals of a comparator. The output of the CPA is generated by the output of the preceding stage and the output of the constant multiplier.

For example, the output of the CPA 107 in the second stage is input to one of the input terminals of the comparator 205. The output of the CPA 207 is generated by the output of the CPA 108 of the first stage and the output of the constant multiplier 201.

In the division circuit of the first embodiment shown in FIG. 3, the sum component and the carry component provided from the CSA 72 and then shifted by the shifters 73 and 74 in the first stage are provided to the input terminals of the CPA 77. And the output of the CPA 77 is input to one input terminals of each of the comparators 75, 76, . . . .

On the other hand, in the division circuit of the second embodiment shown in FIG. 4, the sum component and the carry component provided from the CSA 102 and then shifted by the shifters 103 and 104 in the first stage are provided to the input terminals of the CPA 108. The outputs of the CPA 108 in the first stage and the constant multiplier 201 in the second stage are input to the comparators 75, 76, . . . in the second stage. Finally, the output of the CPA 207 is provided to one input terminal of each of the comparators 205, 206, . . . . Thereby, the output of the CPA 207 in the second stage is obtained by the addition operation between the result of the addition operation for the upper bits between the shifted sum component and the carry component at the CPA 108 in the first stage and the upper bits of the result obtained by multiplying the divisor by the constant multiple at the constant multiplier 201.

Accordingly, the division operation by the division circuit of the second embodiment shown in FIG. 4 can be performed faster than that of the first embodiment shown in FIG. 3, because the delay time per stage in the division circuit of the second embodiment can be smaller than that of the first embodiment.

The scope of this invention is not limited to the preceding embodiments but includes numerous modifications that will be obvious to one skilled in the art.

What is claimed is:

1. A division circuit having a plurality of stages based on a repeat arithmetic operation method, each stage comprising:

constant multiple means for multiplying a divisor by a predetermined constant multiple;

first addition means for performing an addition operation between a dividend and a value obtained by multiplying the divisor by a constant multiple provided from the constant multiple means, and for outputting a sum component and a carry component as a result of the addition operation;

shift means for shifting the sum component and the carry component by a shift amount in accordance with a radix;

second addition means for performing an addition operation between the upper bits of the shifted sum component and the shifted carry component, obtained by the shift means, by predetermined bits; and comparison means for outputting a part of a quotient comprising a plurality of bits by comparing the result obtained by the second addition means and the value obtained by multiplying the divisor by the constant multiple and for determining the value of the constant multiple of the constant multiple means based on the comparison result, wherein the value of the constant multiple at a following constant multiple means is determined by the output of the comparison means and the output of the second addition means, the sum component and the carry component obtained by the first addition means are provided to a first addition means in the following stage, and the dividend and zero in place of the sum component and the carry component are input to the first addition means in a first stage.

2. A division circuit according to claim 1, wherein the first addition means comprises a carry save type adder, based on a carry save method, in which a sum component and a carry component are output and the second addition means comprises a carry propagation type adder.

3. A division circuit having a plurality of stages based on a repeat arithmetic operation method, each stage comprising:

constant multiple means for multiplying a divisor by a predetermined constant multiple;

first addition means for performing an addition operation between a dividend and a value obtained by multiplying the divisor by a constant multiple provided from the constant multiple means, and for outputting a sum component and a carry component as a result of the addition operation;

shift means for shifting the sum component and the carry component by a shift amount in accordance with a radix;

second addition means for performing an addition operation between the upper bits of the shifted sum component and the shifted carry component, obtained by the shift means, by predetermined bits; and third addition means for performing an addition operation between the upper bits of the result of the addition operation obtained by the second addition means in the preceding stage and the constant multiple value of the divisor obtained by the constant multiple means in the preceding stage;

comparison means for outputting a part of a quotient comprising a plurality of bits by comparing the results obtained by the third addition means and the value obtained by multiplying the divisor by the constant multiple and for determining the value of the constant multiple of the constant multiple means based on the comparison result, wherein the value of the constant multiple at a following constant multiple means is determined by the output of the comparison means and the output of the second addition means, the sum component and the carry component obtained by the first addition means are provided to a first addition means in the following stage, and the dividend and zero in place of the sum component and the carry component are input to the first addition means in a first stage.

4. A division circuit according to claim 3, wherein the first addition means comprises a carry save type adder, based on a carry save method, in which a sum component and a carry component are output and the second addition means and the third addition means each comprises a carry propagation type adder.

* * * * *